United States Patent
Nakada et al.

(10) Patent No.: US 6,452,784 B2
(45) Date of Patent: Sep. 17, 2002

(54) ALUMINUM ELECTROLYTIC CAPACITOR AND METHOD FOR PRODUCING THE SAME

(75) Inventors: Yasuhiko Nakada, Osaka (JP); Masakazu Tanahashi, Osaka (JP); Emiko Igaki, Hyogo (JP); Mikinari Shimada, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/865,867

(22) Filed: May 25, 2001

(30) Foreign Application Priority Data

May 31, 2000 (JP) ........................................ 2000-163213

(51) Int. Cl.$^7$ .............................................. H01G 9/042
(52) U.S. Cl. ........................ 361/509; 361/508; 361/518; 361/512; 361/528; 29/25.03
(58) Field of Search ................................. 361/509, 508, 361/506, 511, 512, 518, 520, 523, 528, 503, 504, 579, 538; 29/25.03

(56) References Cited

U.S. PATENT DOCUMENTS

| | | | | |
|---|---|---|---|---|
| 4,593,343 A | * | 6/1986 | Ross | 361/433 |
| 5,870,275 A | * | 2/1999 | Shiono et al. | 361/504 |
| 6,128,179 A | * | 10/2000 | Morokuma | 361/517 |
| 6,166,899 A | * | 12/2000 | Tamamitsu | 361/504 |
| 6,307,735 B1 | * | 10/2001 | Saito et al. | 361/517 |

FOREIGN PATENT DOCUMENTS

| | | |
|---|---|---|
| JP | 62-17185 | 1/1987 |
| JP | 2000-311680 | 11/2000 |

* cited by examiner

*Primary Examiner*—Dean A. Reichard
*Assistant Examiner*—Nguyen Ha
(74) *Attorney, Agent, or Firm*—Merchant & Gould P.C.

(57) ABSTRACT

An aluminum electrolytic capacitor includes a case, a sealant for sealing the case, a separator, a cathode, an anode, and an electrolyte sealed in the case, and an anode lead connected to the anode, wherein the cathode includes an aluminum foil, and a solid compound having a function of keeping the pH of the electrolyte constant further is provided in the case.

6 Claims, 7 Drawing Sheets

ALUMINUM ELECTROLYTIC CAPACITOR AND METHOD FOR PRODUCING THE SAME

BACKGROUND OF THE INVENTION

1. Field of the Invention

The present invention relates to an aluminum electrolytic capacitor and a method for producing the same.

2. Description of the Related Art

When an aluminum electrolytic capacitor is left in a high-temperature atmosphere without a load, the capacity thereof is decreased and gas is generated to increase an internal pressure, which leads to leakage of liquid. This phenomenon is caused by corrosion of a cathode foil made of aluminum, and becomes more conspicuous in a system with water added to an electrolyte. Furthermore, in the case where an aluminum electrolytic capacitor is left at a high temperature under the application of a voltage, an anode lead made of aluminum is subjected to electrolytic etching, which eventually results in disconnection.

As a method for preventing such corrosion of aluminum, a method for treating the surface of aluminum with phosphoric acid to form a coating of aluminum phosphate is known conventionally (see JP 62 (1987)-17185 A). According to this method, by previously forming a coating of aluminum phosphate, a corrosion reaction ($Al \rightarrow Al^{3+} + 3e^-$) is prevented.

However, even if such treatment is conducted, corrosion may not be prevented sufficiently. Particularly, in the case where a moisture content of an electrolyte is increased, corrosion is likely to occur.

SUMMARY OF THE INVENTION

Therefore, with the foregoing in mind, it is an object of the present invention to provide an aluminum electrolytic capacitor with high reliability and a method for producing the same.

In order to achieve the above-mentioned object, the aluminum electrolytic capacitor of the present invention includes: a case; a sealant for sealing the case; a separator, a cathode, an anode, and an electrolyte sealed in the case; and two leads respectively connected to the cathode and the anode, wherein the cathode and the anode include an aluminum foil, the leads are made of aluminum, and a solid compound for keeping a pH of the electrolyte constant further is provided in the case. According to this configuration, the pH of the electrolyte can be prevented from being decreased too much, so that an aluminum electrolytic capacitor with high reliability can be obtained.

In the above-mentioned aluminum electrolytic capacitor, pits may be formed on a surface of at least one electrode selected from the cathode and the anode, and the solid compound may be disposed in the pits. According to this configuration, in particular, the corrosion of an electrode can be prevented.

In the above-mentioned aluminum electrolytic capacitor, the solid compound may adhere to the separator. According to this configuration, in particular, corrosion of an electrode can be prevented.

In the above-mentioned aluminum electrolytic capacitor, the solid compound may adhere to a surface of the lead. According to this configuration, in particular, corrosion of a lead can be prevented.

In the above-mentioned aluminum electrolytic capacitor, the solid compound may contain metal, and an oxidation potential $E_M$ at which the metal changes to positive ions and an oxidation potential $E_A$ at which aluminum changes to aluminum ions may satisfy a relationship: $E_M \leq E_A$.

In the above-mentioned aluminum electrolytic capacitor, the solid compound may include at least one compound selected from the group consisting of an oxide of yttrium, a hydroxide of yttrium, an oxide of aluminum, a hydroxide of aluminum, an oxide of scandium, a hydroxide of scandium, an oxide of lanthanum, a hydroxide of lanthanum, an oxide of praseodymium, a hydroxide of praseodymium, an oxide of neodymium, a hydroxide of neodymium, an oxide of promethium, a hydroxide of promethium, an oxide of cerium, a hydroxide of cerium, an oxide of gadolinium, a hydroxide of gadolinium, an oxide of terbium, a hydroxide of terbium, an oxide of dysprosium, a hydroxide of dysprosium, an oxide of holmium, a hydroxide of holmium, an oxide of erbium, a hydroxide of erbium, an oxide of thulium, a hydroxide of thulium, an oxide of lutetium, a hydroxide of lutetium, an oxide of beryllium, and a hydroxide of beryllium. According to this configuration, an aluminum electrolytic capacitor with particularly high reliability can be obtained.

Furthermore, the first production method of the present invention is a method for producing an aluminum electrolytic capacitor including a cathode and an anode, including the processes of: (i) soaking an aluminum foil with pits formed on a surface thereof in an aqueous solution of a nitrate of metal; and (ii) after the process (i), soaking the aluminum foil in an alkaline aqueous solution to form a hydroxide of the metal in the pits, thereby forming at least one electrode selected from the cathode and the anode, wherein an oxidation potential $E_M$ at which the metal changes to positive ions and an oxidation potential $E_A$ at which aluminum changes to aluminum ions satisfy a relationship: $E_M \leq E_A$. According to this production method, a highly reliable electrolytic capacitor can be produced in which an electrode is unlikely to corrode.

According to the above-mentioned first production method, the metal may include at least one metal selected from the group consisting of yttrium, aluminum, scandium, lanthanum, praseodymium, neodymium, promethium, cerium, gadolinium, terbium, dysprosium, holmium, erbium, thulium, lutetium, and beryllium.

According to the above-mentioned first production method, a pH of the alkaline aqueous solution is in a range of 8 to 12.

Furthermore, a second production method of the present invention is a method for producing an aluminum electrolytic capacitor including a cathode and an anode, including the processes of: (I) soaking an aluminum foil with pits formed on a surface thereof in an aqueous solution of a nitrate of metal; and (II) after the process (I), heat-treating the aluminum foil to form an oxide of the metal in the pits, thereby forming at least one electrode selected from the cathode and the anode, wherein an oxidation potential $E_M$ at which the metal changes to positive ions and an oxidation potential $E_A$ at which aluminum changes to aluminum ions satisfy a relationship: $E_M \leq E_A$. According to this production method, a highly reliable electrolytic capacitor can be produced in which an electrode is unlikely to corrode.

According to the above-mentioned second production method, the metal may include at least one metal selected from the group consisting of yttrium, aluminum, scandium, lanthanum, praseodymium, neodymium, promethium, cerium, gadolinium, terbium, dysprosium, holmium, erbium, thulium, lutetium, and beryllium.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments with reference to the drawings. It should be noted that the following embodiments are described for illustrative purpose, and the present invention is not limited thereto.

Embodiment 1

In Embodiment 1, an aluminum electrolytic capacitor of the present invention will be described.

First, a mechanism will be described in which corrosion of an electrode and a lead proceeds in the aluminum electrolytic capacitor.

When the aluminum electrolytic capacitor is left without the application of a voltage, a cathode mainly corrodes. The corrosion of a cathode occurs due to the battery effect based on nonuniformity of an oxygen concentration in an electrolyte as described below. A capacitor element of the aluminum electrolytic capacitor typically is composed of an anode made of an aluminum foil, a cathode made of an aluminum foil, and a separator. The anode and the cathode tightly are wound into a coil shape with a separator interposed therebetween. The concentration of dissolved oxygen in the electrolyte is different between an outer peripheral portion and a center portion of the coil, so that a potential difference is caused therebetween. Consequently, an electrode (in particular, a cathode) at the center portion of the coil corrodes due to the battery effect. Furthermore, because of this corrosion, a reaction $(Al^{3+}+H_2O \rightarrow Al(OH)^{2+}+H^+)$ is effected at the center portion of the capacitor element. Therefore, the electrolyte is shifted to an acid side, which further accelerates the corrosion. In order to prevent such corrosion of an electrode, it is most effective to neutralize increasing levels of $H^+$.

Furthermore, when a voltage is applied to the aluminum electrolytic capacitor, an anode lead mainly becomes likely to corrode. The corrosion of an anode lead occurs due to electrolytic etching as described below. In the aluminum electrolytic capacitor, an electrolyte therein is decreased due to evaporation with the passage of time. At this time, the electrolyte adhering to the surface of the anode lead in a case gradually is losing a buffer property along with evaporation, so that the anode lead becomes likely to corrode. Once the corrosion occurs, $H^+$ further is concentrated to accelerate the corrosion in a corrosion pit. It also is effective to neutralize increasing levels of $H^+$ with respect to the corrosion of the anode lead, in the same way as in the corrosion of a cathode foil.

Figure 1:
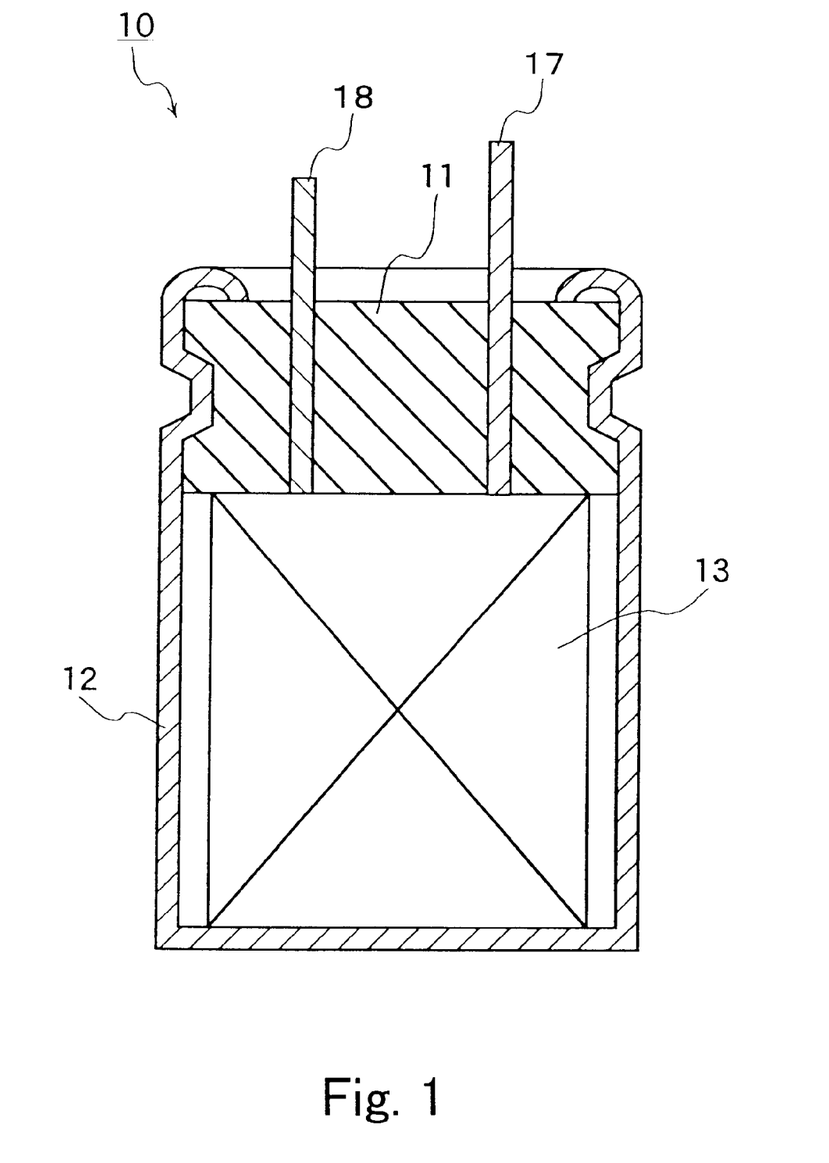
FIG. 1 is a cross-sectional view showing an exemplary aluminum electrolytic capacitor of the present invention.

FIG. 1 schematically shows a cross-sectional view of an aluminum electrolytic capacitor 10 of Embodiment 1 that can suppress the above-mentioned corrosion.

Figure 2:
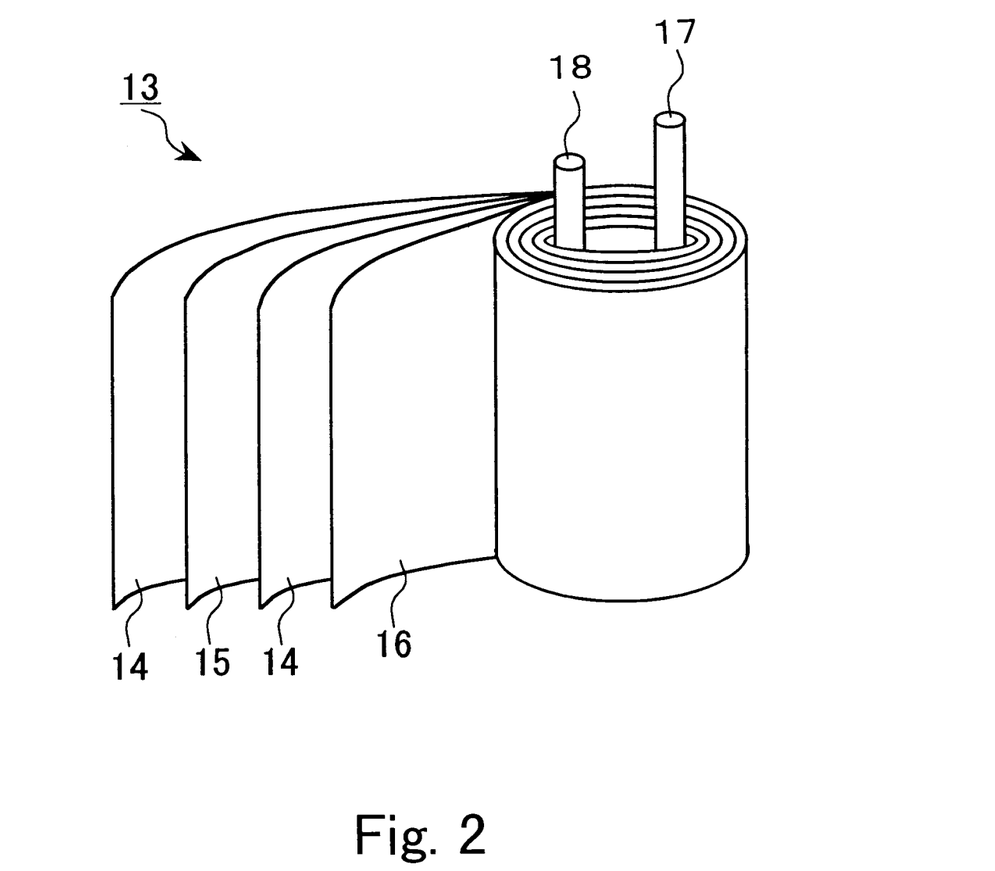
FIG. 2 is a partially exploded perspective view of the aluminum electrolytic capacitor shown in FIG. 1.

Referring to FIG. 1, the aluminum electrolytic capacitor 10 includes a case 12 sealed with a sealant 11, a capacitor element 13 sealed in the case 12, and an electrolyte (not shown). FIG. 2 schematically shows an exploded perspective view of the capacitor element 13. The capacitor element 13 includes a separator 14, an anode (anode foil) 15 and a cathode (cathode foil) 16 disposed so as to interpose the separator 14, and an anode lead 17 connected to the anode 15 and a cathode lead 18 connected to the cathode 16. Hereinafter, the anode 15 and the cathode 16 may be referred to as an electrode foil collectively, and the anode lead 17 and the cathode lead 18 may be referred to as a lead collectively. The separator 14, the anode 15, and the cathode 16 are wound and sealed in the case 12. The electrolyte is held mainly by the separator 14.

The sealant 11 is made of, for example, rubber or resin.

As the electrolyte, for example, an electrolyte used generally in an aluminum electrolytic capacitor can be used. For example, an electrolyte containing ethylene glycol can be used. More specifically, an electrolyte containing water, ethylene glycol, and a solvent such as ammonium adipate can be used. The electrolyte contains a corrosion inhibitor, if required. The initial pH of the electrolyte is, for example, about 5 to 7. In particular, the electrolyte contains preferably 30% to 60% by mass of water. According to this configuration, an aluminum electrolytic capacitor is obtained that has a particularly low equivalent series resistance (hereinafter, referred to as an "ESR").

As the separator 14, electrolytic paper used generally in an aluminum electrolytic capacitor, for example Manila paper, can be used.

As the anode 15 and the cathode 16, an aluminum foil used generally in an electrolytic capacitor can be used. Furthermore, as the anode lead 17 and the cathode lead 18, an aluminum lead used generally in an electrolytic capacitor can be used.

The aluminum electrolytic capacitor 10 further contains a solid compound (hereinafter, which may be referred to as a "solid compound A") for keeping the pH of the electrolyte constant in the case 12. More specifically, in the aluminum electrolytic capacitor 10, a solid compound A is placed on the surface or inner portion of at least one constituent member selected from the group consisting of an electrode foil, a separator, a lead, and a sealant. The solid compound A may be dispersed in the electrolyte.

When dispersed, in a solid state, in an aqueous solution (electrolyte), the solid compound A functions so as to keep the pH of the aqueous solution constant. More specifically, the solid compound A functions as a buffer.

As the solid compound A, those which contain metal and satisfy the following three conditions can be used. As the first condition, it is required that a compound can remain in an electrolyte stably to some degree. As the second condition, it is required that a compound contains metal (hereinafter, which may be referred to as "metal M")

wherein an oxidation potential $E_M$ at which the metal changes to positive ions is equal to or lower than an oxidation potential $E_A$ at which aluminum changes to aluminum ions. More specifically, the oxidation potential $E_M$ at which the metal M changes to positive ions and $E_A$ satisfy the relationship: $E_M \leq E_A$ (preferably, $E_M \leq E_A$). As the third condition, it is required that a compound neutralizes $H^+$ in an electrolyte.

Examples of the solid compound A satisfying the above-mentioned conditions include yttrium oxide and yttrium hydroxide. When an electrolyte attempts to be shifted to an acid side, yttrium oxide itself changes to yttrium ions to be dissolved in an aqueous solution, thereby keeping the pH constant ($Y_2O_3 + 6H^+ \rightarrow 2Y^{3+} + 3H_2O$). Yttrium hydroxide also has the similar function ($Y(OH)_3 + 3H^+ \rightarrow Y^{3+} + 3H_2O$). In the aluminum electrolytic capacitor 10, by utilizing such a property of the solid compound A, the pH of the electrolyte can be kept constant to suppress corrosion.

As the solid compound A, compounds other than yttrium oxide and yttrium hydroxide can be used as long as they satisfy the above-mentioned conditions. Specifically, it is preferable that the solid compound A includes at least one compound selected from the group consisting of an oxide of yttrium, a hydroxide of yttrium, an oxide of aluminum, a hydroxide of aluminum, an oxide of scandium, a hydroxide of scandium, an oxide of lanthanum, a hydroxide of lanthanum, an oxide of praseodymium, a hydroxide of praseodymium, an oxide of neodymium, a hydroxide of neodymium, an oxide of promethium, a hydroxide of promethium, an oxide of cerium, a hydroxide of cerium, an oxide of gadolinium, a hydroxide of gadolinium, an oxide of terbium, a hydroxide of terbium, an oxide of dysprosium, a hydroxide of dysprosium, an oxide of holmium, a hydroxide of holmium, an oxide of erbium, a hydroxide of erbium, an oxide of thulium, a hydroxide of thulium, an oxide of lutetium, a hydroxide of lutetium, an oxide of beryllium, and a hydroxide of beryllium. In other words, as the metal M, at least one metal selected from the group consisting of yttrium, aluminum, scandium, lanthanum, praseodymium, neodymium, promethium, cerium, gadolinium, terbium, dysprosium, holmium, erbium, thulium, lutetium, and beryllium can be used. Furthermore, other compounds can be used as the solid compound A as long as they have the property similar to that of the above-mentioned compounds. Among the above-mentioned solid compounds, yttrium oxide or yttrium hydroxide is particularly preferable because they change to ions to be dissolved at a relatively high speed.

Hereinafter, the case will be described successively in which the solid compound A is added to a cathode, a separator, a lead, or a sealant. The aluminum electrolytic capacitor 10 includes at least one constituent member selected from the group consisting of an electrode, a separator, a lead, and a sealant described below.

Cathode

Figure 3:
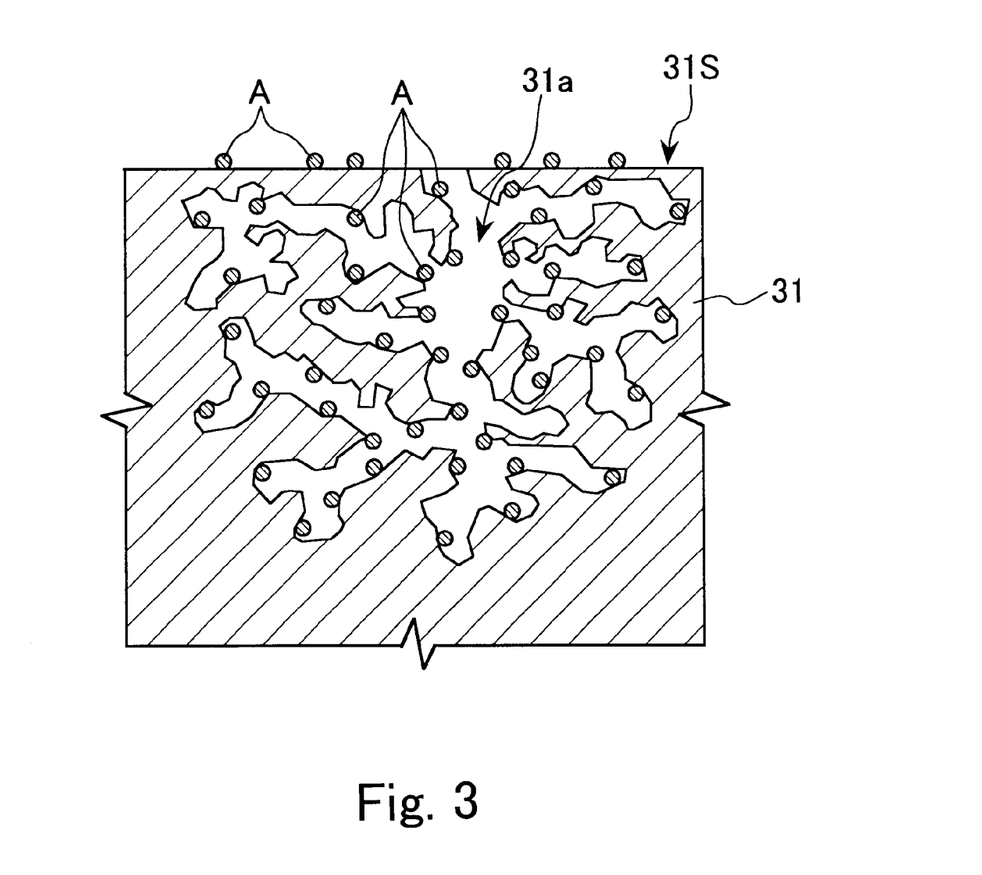
FIG. 3 is a cross-sectional view showing an exemplary cathode foil of the aluminum electrolytic capacitor of the present invention.

As the cathode 16, it is preferable to use an aluminum foil in which pits are formed on the surface, and the solid compound A is disposed in the pits. FIG. 3 schematically shows a cross-sectional view of an aluminum foil 31 with such a configuration. The aluminum foil 31 has pits 31a on a surface 31s. The solid compound A is disposed in the pits 31a. An aluminum foil similar to that of the cathode 16 may be used for the anode 15. More specifically, it may be possible that pits are formed on the surface of at least one electrode selected from the anode 15 and the cathode 16, and the solid compound A is disposed in the pits.

Hereinafter, an exemplary method for producing a cathode foil will be described in the case where the solid compound A is yttrium hydroxide. First, an aluminum foil with pits formed on the surface is prepared. The pits on the surface of the aluminum foil can be formed, for example, by electrolytic etching or chemical etching.

Next, by soaking the aluminum foil in a yttrium nitrate aqueous solution, the pits of the aluminum foil are impregnated with the yttrium nitrate aqueous solution. Thereafter, the aluminum foil is soaked in a sodium hydroxide aqueous solution, thereby allowing yttrium hydroxide to adhere to the pits. At this time, the pH of the sodium hydroxide aqueous solution may be 8 or higher. Aluminum has the property of being dissolved in an alkaline aqueous solution, so that the aluminum foil preferably is treated with an alkaline aqueous solution that is as close as possible to neutral. More specifically, the pH of the alkaline aqueous solution preferably is in a range of 8 to 12. Furthermore, treatment at a high temperature for a long period of time also damages an aluminum foil, so that treatment at a low temperature for a short period of time preferably is conducted.

Next, the case will be described in which the solid compound A is yttrium oxide. First, by soaking an aluminum foil in an yttrium nitrate aqueous solution, the pits of the aluminum foil are impregnated with the yttrium nitrate aqueous solution. Thereafter, the aluminum foil is heat-treated to thermally decompose yttrium nitrate, thereby allowing yttrium oxide to adhere to the pits. The heat treatment can be conducted, for example, in the atmosphere at 500° C. for 10 minutes.

Even in the case where the solid compound A is a hydroxide or an oxide of metal other than yttrium, the solid compound A can be formed by the same method.

Separator

Figure 4:
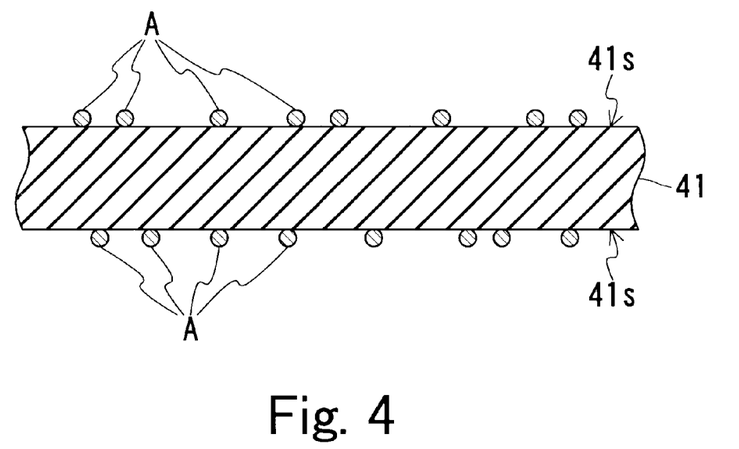
FIG. 4 is a cross-sectional view showing an exemplary separator of the aluminum electrolytic capacitor of the present invention.

As the separator 14, it is preferable to use a separator to the surface of which the solid compound A adheres. FIG. 4 schematically shows a cross-sectional view of the separator 41 with such a configuration. The solid compound A adheres to a surface 41s of the separator 41.

The separator to the surface of which the solid compound A adheres may be obtained by rubbing powder of the solid compound A (e.g., yttrium oxide) into a separator directly. As the separator, electrolytic paper (e.g., Manila paper) used generally in the aluminum electrolytic capacitor can be used.

As the powder of the solid compound A (e.g., yttrium oxide), commercially available powder may be used as it is. However, it is preferable that commercially available powder is ground in a mortar so as to reduce a particle size. By reducing a particle size, the adhesion of the powder to the separator is enhanced, and the powder readily can be ionized when it functions as a solid compound. More specifically, the average particle size of the powder preferably is in a range of 1 to 100 $\mu$m.

Lead

Figure 5:
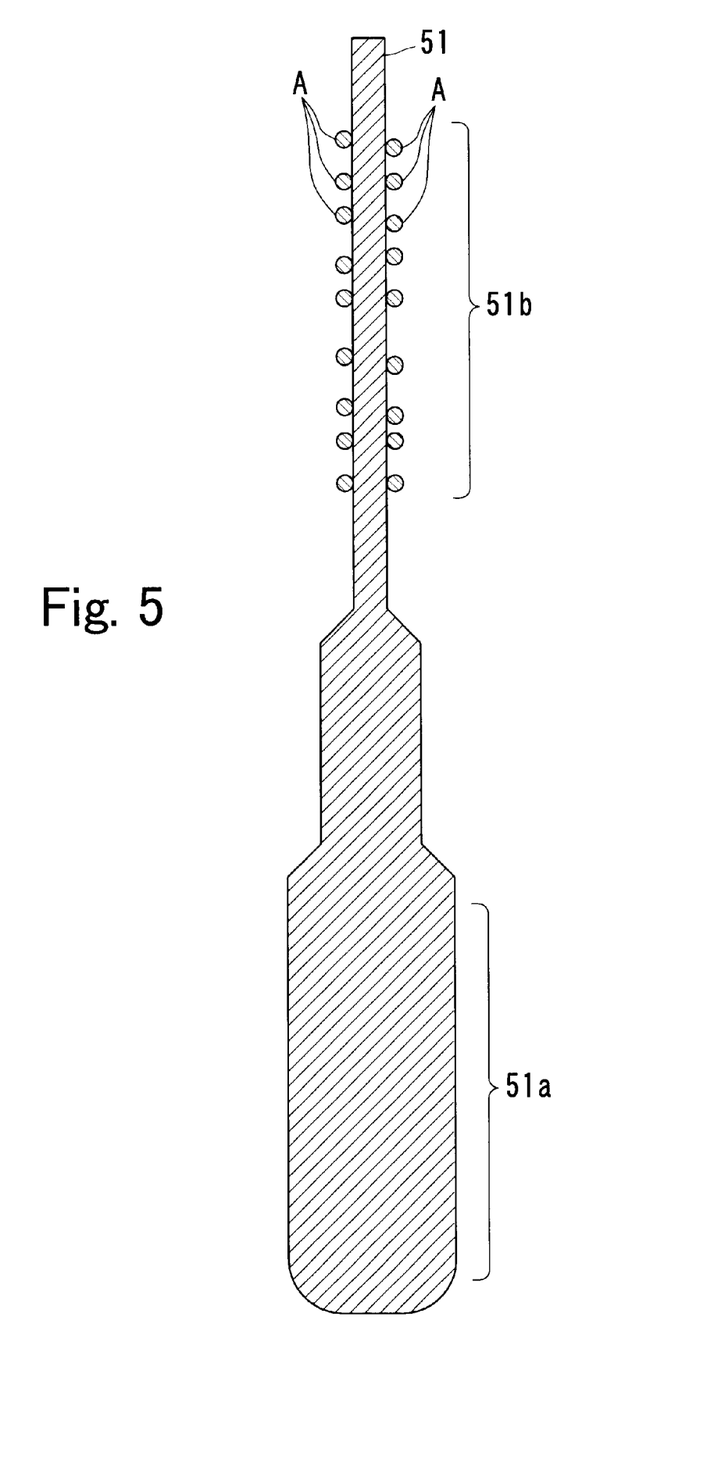
FIG. 5 is a cross-sectional view showing an exemplary lead of the aluminum electrolytic capacitor of the present invention.

As the lead (in particular, the anode lead 17), it is preferable to use a lead to the surface of which the solid compound A adheres. FIG. 5 shows a cross-sectional view of a lead 51 with such a configuration. The lead 51 is made of bar-shaped aluminum, and includes a portion 51a around which electrode foils are wound and a portion 51b positioned in a through-hole of a sealant. The solid compound A adheres to the surface of the portion 51b.

In the case where yttrium hydroxide or yttrium oxide is used as the solid compound A, a lead with the solid compound A adhering thereto can be produced by the same method as that of the cathode foil.

As a lead that allows the solid compound A to adhere thereto, an aluminum lead used generally in the aluminum electrolytic capacitor can be used.

Sealant

Figure 6:
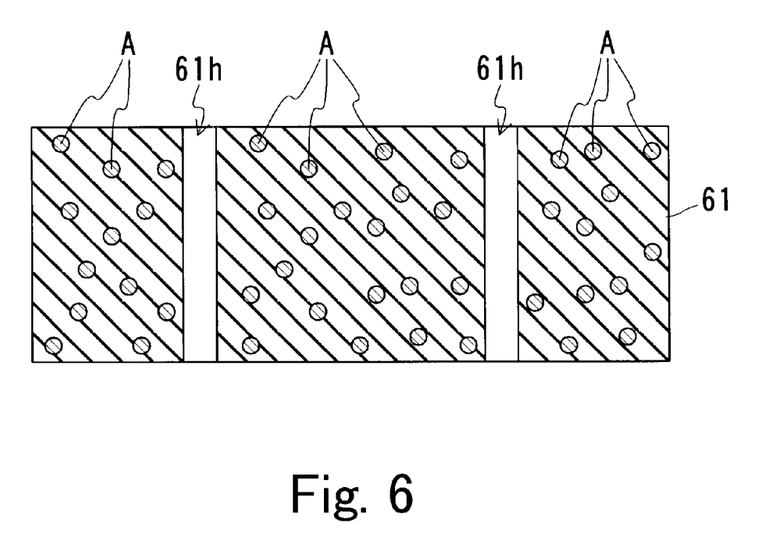
FIG. 6 is a cross-sectional view showing an exemplary sealant of the aluminum electrolytic capacitor of the present invention.

As the sealant 11, it is preferable to use a sealant containing the solid compound A. More specifically, it is preferable that the sealant 11 is made of rubber or resin with the solid compound A added thereto. FIG. 6 schematically shows a cross-sectional view of a sealant 61 with such a configuration. The sealant 61 has a disk shape, in which two through-holes 61h for insertion of leads are formed. The solid compound A is added to an inside of the sealant 61.

As a material for rubber, for example, a butyl rubber polymer that is a copolymer of isobutylene, isoprene, and divinylbenzene can be used. The powder of the solid compound A can be added together with other materials in the course of production of rubber to be a material for the sealant. It is preferable that the powder of the solid compound A to be added has an average particle size in a range of 1 to 100 µm.

The aluminum electrolytic capacitor 10 contains the solid compound A that has a function of keeping the pH of an electrolyte constant. Therefore, a decrease in the capacity due to the corrosion of an electrode (in particular, a cathode) can be prevented, and gas generation while the capacitor is left without a load also can be prevented. Thus, high reliability can be obtained in the aluminum electrolytic capacitor 10. Furthermore, compared with a conventional aluminum electrolytic capacitor under the same lifetime condition, the aluminum electrolytic capacitor 10 can use an electrolyte containing a large amount of moisture and having a high conductivity, so that an ESR further can be decreased. Furthermore, by using a lead or a sealant with the solid compound A added thereto, a capacitor is obtained in which disconnection of a lead is unlikely to occur.

Embodiment 2

In Embodiment 2, a first method of the present invention for producing an aluminum electrolytic capacitor will be described.

Figure 7A:
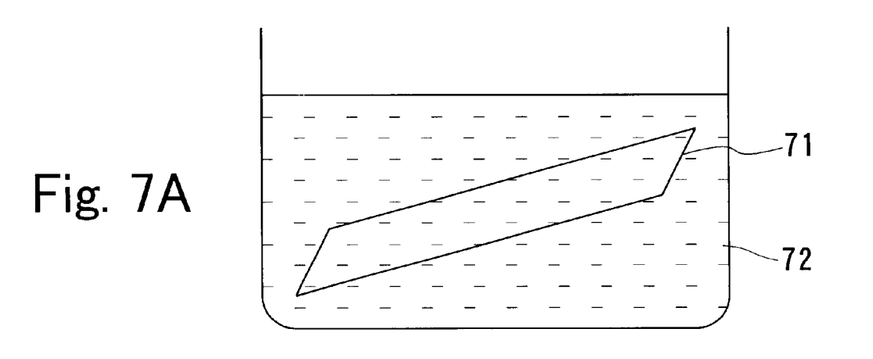
FIGS. 7A and 7B show processes of an exemplary method for producing an aluminum electrolytic capacitor of the present invention.
Figure 7B:
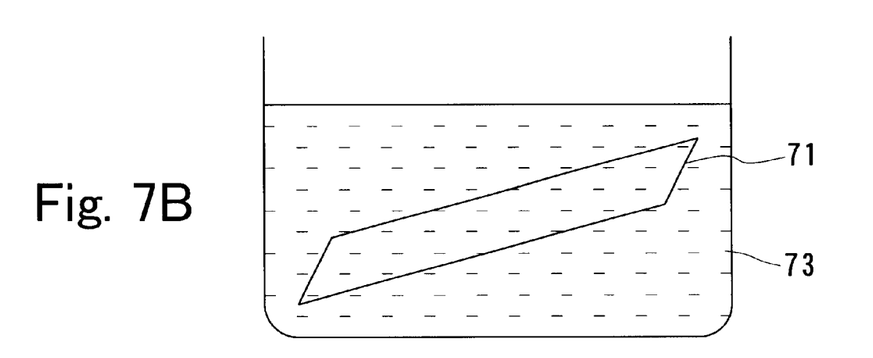

FIGS. 7A and 7B are cross-sectional views illustrating processes of the production method of Embodiment 2. According to the production method, first as shown in FIG. 7A, an aluminum foil 71 with pits (see FIG. 3) formed on the surface is soaked in an aqueous solution 72 of a nitrate of metal (Process (i)). During this process, the pits of the aluminum foil 71 are filled with the aqueous solution 72. As the aqueous solution 72, an aqueous solution of a nitrate of the metal M described in Embodiment 1 can be used. More specifically, it is possible to use an aqueous solution of a nitrate containing at least one metal selected from the group consisting of yttrium, aluminum, scandium, lanthanum, praseodymium, neodymium, promethium, cerium, gadolinium, terbium, dysprosium, holmium, erbium, thulium, lutetium, and beryllium. The concentration of a nitrate in the aqueous solution 72 is, for example, in a range of 0.05 to 0.5 mol/L.

Thereafter, as shown in FIG. 7B, the aluminum foil 71 is soaked in an alkaline aqueous solution 73, whereby a hydroxide of the metal M is formed in the pits (Process (ii)). Thus, the aluminum foil 71 in which a hydroxide of the metal M (compound A) is formed in the pits is obtained. The aluminum foil 71 is used as at least one electrode selected from a cathode and an anode. When used as a cathode, the aluminum foil 71 has particularly satisfactory effects.

An aluminum electrolytic capacitor is produced by the same processes as those of an ordinary production method, except for the above-mentioned method for forming an electrode. More specifically, an anode foil and a cathode foil are connected to an anode lead and a cathode lead, respectively. Then, the anode foil and the cathode foil are wound into a coil shape with a separator interposed therebetween to form a capacitor element, and the separator is impregnated with an electrolyte. Thereafter, the capacitor element is inserted into a case, and the case is sealed with a sealant. Thus, an aluminum electrolytic capacitor is produced. According to the production method of Embodiment 2, an aluminum electrolytic capacitor of the present invention with the solid compound A adhering to an electrode can be produced.

Embodiment 3

In Embodiment 3, a second method of the present invention for producing an aluminum electrolytic capacitor will be described. The same portions as those in Embodiment 2 are denoted with the same reference numerals as those therein, and repeated description thereof will be omitted here.

According to the production method of Embodiment 3, first as shown in FIG. 7A, an aluminum foil 71 with pits (see FIG. 3) formed on the surface is soaked in an aqueous solution 72 of a nitrate of metal (Process (I)). Process (I) is the same as Process (i) described in Embodiment 2. During this process, the pits of the aluminum foil 71 are filled with the aqueous solution 72. As the aqueous solution 72, an aqueous solution of a nitrate of the metal M described in Embodiment 1 can be used. More specifically, it is possible to use an aqueous solution of a nitrate containing at least one metal selected from the group consisting of yttrium, aluminum, scandium, lanthanum, praseodymium, neodymium, promethium, cerium, gadolinium, terbium, dysprosium, holmium, erbium, thulium, lutetium, and beryllium. The concentration of a nitrate in the aqueous solution 72 is, for example, in a range of 0.05 to 0.5 mol/L.

Thereafter, the aluminum foil 71 is pulled up from the aqueous solution 72 and dried. Then, the aluminum foil 71 is heat-treated, whereby an oxide of the metal M is formed in the pits (Process (II)). Because of this heat treatment, the nitrate of the metal M is thermally decomposed to become an oxide of the metal M. The heat treatment can be conducted, for example, at 500° C. for 10 minutes. Thus, the aluminum foil 71 with a hydroxide of the metal M (compound A) formed in the pits is obtained, and used as at least one electrode selected from a cathode and an anode. When used as a cathode, the aluminum foil 71 has particularly satisfactory effects.

An aluminum electrolytic capacitor is produced as described in Embodiment 2, except for the above-mentioned method for forming an electrode. According to the production method of Embodiment 3, an aluminum electrolytic capacitor of the present invention with the solid compound A adhering to an electrode can be produced.

EXAMPLES

Hereinafter, the present invention will be described in more detail by way of illustrative examples.

Example 1

In Example 1, the case will be described in which the solid compound A is allowed to adhere to the surface of a cathode foil and hollow portions of etching pits.

First, an yttrium nitrate aqueous solution with a concentration of 10% by mass was prepared. Furthermore, as a cathode foil, an aluminum foil for a low-voltage electrolytic capacitor was prepared. Then, the aluminum foil was soaked in the yttrium nitrate aqueous solution for several seconds so as to be impregnated sufficiently with yttrium nitrate. Next, the aluminum foil was pulled up from the yttrium nitrate aqueous solution, and excess liquid was removed from the foil. Then, the aluminum foil was treated with an alkaline aqueous solution. More specifically, the aluminum foil was soaked in a sodium hydroxide aqueous solution (pH 8) for 10 seconds. After soaking, the aluminum foil was pulled up from the solution, and excess liquid was removed from the foil. Finally, the aluminum foil was washed briefly with pure water in such a manner that the deposited yttrium hydroxide would not flow away, followed by being dried. By the above-mentioned procedure, yttrium hydroxide was allowed to adhere to the surface of the aluminum foil and the wall surface of etching pits in the foil, whereby a cathode foil was formed.

By using the cathode foil thus formed, an aluminum electrolytic capacitor was produced. Ordinary members were used for the portions other than the cathode foil.

Example 2

In Example 2, the case will be described in which the solid compound A is allowed to adhere to a separator.

First, a reagent of yttrium oxide (purity: 99.99% or more, produced by Wako Pure Chemical Industries, Ltd.) was ground in a mortar to form fine particles. As a separator, Manila paper that is electrolytic paper for a low-voltage electrolytic capacitor was prepared. Then, the powder of yttrium oxide in a fine particle shape is dispersed uniformly onto the separator through a fine sieve, and the yttrium oxide powder was rubbed with a finger so as to adhere to the separator. Thereafter, excess remaining powder was shaken off. Thus, the separator with the yttrium oxide powder adhering thereto was produced. In the present example, yttrium oxide was allowed to adhere to the separator in an amount of 0.1 mg per $cm^2$. An aluminum electrolytic capacitor was produced by using the separator thus produced. Ordinary members were used for the portions other than the separator.

Comparative Example 1

In Comparative Example 1, an aluminum electrolytic capacitor was produced by using a cathode foil and a separator that were not provided with the solid compound A. The portions other than the cathode foil and the separator had the same configuration as that of the aluminum electrolytic capacitor of Examples 1 and 2.

The capacitors of Examples 1, 2, and Comparative Example 1 were left at a high temperature without application of a voltage. This test was conducted by leaving the capacitors at 85° C. for 5000 hours.

Thereafter, each capacitor was disassembled, and the state of corrosion and a change in capacity of each cathode foil were checked. The state of corrosion of each cathode foil was evaluated by visually observing each cathode foil before and after each capacitor was left. Furthermore, a change in capacity of each cathode foil was evaluated by the following equation: Capacity retention ratio (%)={(Capacity after a capacitor is left at a high temperature)/(Capacity before a capacitor is left at a high temperature)}×100.

As a result, in the capacitors of Examples 1 and 2, an outer appearance of a cathode foil was not changed, and a capacity retention ratio was 95%. On the other hand, in the capacitor of Comparative Example 1, an outer appearance of a cathode foil changed to black, and a capacity retention ratio was 60%. Thus, according to the test of leaving a capacitor at a high temperature, the capacity of a cathode foil was decreased substantially in the capacitor of Comparative Example 1, whereas the capacity of a cathode foil hardly changed in the aluminum electrolytic capacitors of Examples 1 and 2.

Example 3

In Example 3, the case will be described in which the solid compound A is allowed to adhere to the surface of an anode lead. First, as an anode lead, an aluminum lead for a low-voltage electrolytic capacitor was prepared. The anode lead was soaked in an yttrium nitrate aqueous solution, thereby allowing yttrium ions to adhere to the surface of the anode lead. Then, the anode lead was treated with an alkaline aqueous solution, whereby yttrium hydroxide was allowed to adhere to the surface of the anode lead. The procedure and condition of allowing yttrium hydroxide to adhere to the surface of the anode lead were the same as those described in Example 1. An aluminum electrolytic capacitor was produced by using the anode lead thus produced. Ordinary members were used for the portions other than the anode lead.

Example 4

In Example 4, the case will be described in which the solid compound A is added to a sealant. In Example 4, during production of rubber for the sealant, yttrium oxide was added as an additive to produce the sealant. As the rubber to be a material for the sealant, a butyl rubber polymer made of a copolymer of isobutylene, isoprene, and divinylbenzene was used. Furthermore, 10 mg of yttrium oxide was added for 1 g of rubber. An aluminum electrolytic capacitor was produced by using the sealant made of the rubber. Ordinary members were used for the portions other than the sealant.

Comparative Example 2

In Comparative Example 2, an aluminum electrolytic capacitor was produced by using an anode lead and a sealant that were not provided with the solid compound A. The configurations of the portions other than the anode lead and the sealant were the same as those of the aluminum electrolytic capacitors of Examples 3 and 4.

The aluminum electrolytic capacitors of Examples 3, 4, and Comparative Example 2 were left at a high temperature under the application of a voltage. This test was conducted by leaving the capacitors at 85° C. for 5000 hours under the application of a voltage of 6.3 volts.

After the above-mentioned test, each capacitor was disassembled, and the state of corrosion of each anode lead was checked. The state of corrosion of each anode lead was evaluated by visually observing each anode lead before and after the test of leaving each capacitor.

As a result, in the capacitor of Comparative Example 2, after being left at a high temperature, a number of corrosion pits were observed on the surface of an anode lead. In contrast, in the aluminum electrolytic capacitors of Example 3 and 4, no more than a trace of pitting corrosion was observed.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An aluminum electrolytic capacitor, comprising: a case; a sealant for sealing the case; a separator, a cathode, an anode, and an electrolyte sealed in the case; and two leads respectively connected to the cathode and the anode, wherein the cathode and the anode include an aluminum foil, the leads are made of aluminum, and a solid compound for keeping a pH of the electrolyte constant further is provided in the case, the solid compound comprising metal, and having an oxidation potential $E_M$ at which the metal changes to positive ions and an oxidation potential $E_A$ at which aluminum changes to aluminum ions that satisfy a relationship: $E_M \leq E_A$.

2. An aluminum electrolytic capacitor according to claim 1, further comprising pits defined in a surface of at least one electrode selected from the cathode and the anode, wherein the solid compound is disposed in the pits.

3. An aluminum electrolytic capacitor according to claim 1, wherein the solid compound adheres to the separator.

4. An aluminum electrolytic capacitor according to claim 1, wherein the solid compound adheres to a surface of the lead.

5. An aluminum electrolytic capacitor according to claim 1, wherein the sealant contains the solid compound.

6. An aluminum electrolytic capacitor according to claim 1, wherein the solid compound includes at least one compound selected from the group consisting of an oxide of yttrium, a hydroxide of yttrium, an oxide of aluminum, a hydroxide of aluminum, an oxide of scandium, a hydroxide of scandium, an oxide of lanthanum, a hydroxide of lanthanum, an oxide of praseodymium, a hydroxide of praseodymium, an oxide of neodymium, a hydroxide of neodymium, an oxide of promethium, a hydroxide of promethium, an oxide of cerium, a hydroxide of cerium, an oxide of gadolinium, a hydroxide of gadolinium, an oxide of terbium, a hydroxide of terbium, an oxide of dysprosium, a hydroxide of dysprosium, an oxide of holmium, a hydroxide of holmium, an oxide of erbium, a hydroxide of erbium, an oxide of thulium, a hydroxide of thulium, an oxide of lutetium, a hydroxide of lutetium, an oxide of beryllium, and a hydroxide of beryllium.

* * * * *